United States Patent Office

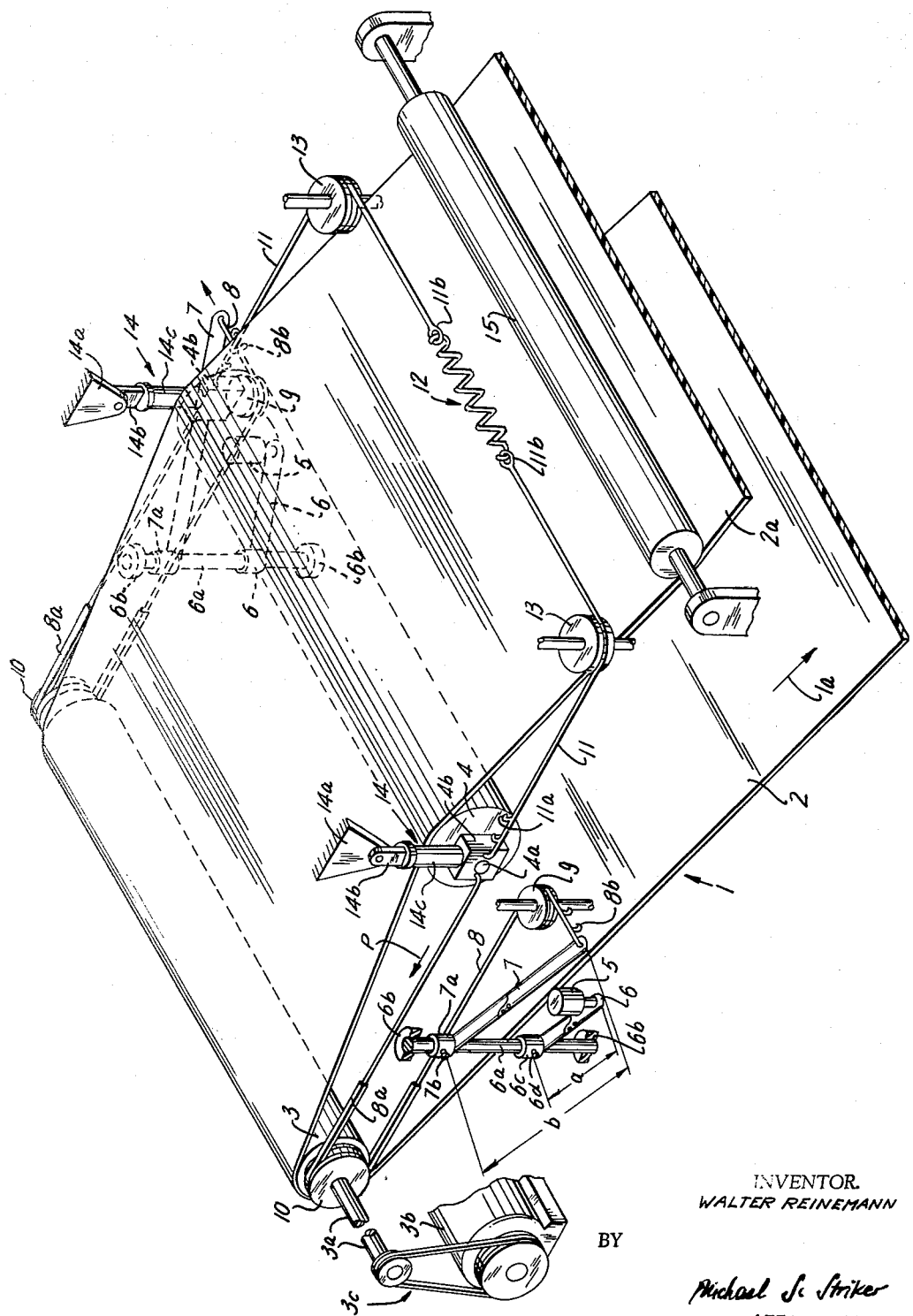

3,245,519
Patented Apr. 12, 1966

3,245,519
BELT CONVEYOR
Walter Reinemann, Bad Hersfeld, Germany, assignor to Benno Schilde Maschinenbau A.G., Bad Hersfeld, Germany
Filed Apr. 10, 1964, Ser. No. 359,199
Claims priority, application Germany, May 2, 1963, Sch 33,221
15 Claims. (Cl. 198—202)

The present invention relates to belt conveyors in general, and more particularly to a novel aligning arrangement for preventing lateral movements of belts in such conveyors. Still more particularly, the invention relates to an arrangement which automatically changes the position of aligning idlers in belt conveyors.

It is well known that a belt which is running out of line may be brought into alignment (i.e., into a predetermined optimum position with reference to the deflecting rollers over which the belt travels) by shifting slightly forward the one or the other end of one or more idler rollers which engage the stringers of the belt. Impulses for such shifting of one or more idlers are produced by sensing devices which are adjacent to the edge faces of the belt and which send signals whenever the belt runs out of line. In many conventional self-aligning systems of which I am aware at this time, the sensing devices are coupled directly to the aligning idlers so that, in acting upon the sensing device or devices, the marginal portions of the belt must by themselves generate the force which is necessary to shift one or more aligning idlers. It is my experience that the belt is often incapable of generating sufficient forces for such shifting, since the aligning idler must be shifted against the pressure to which it is subjected by the belt. The force necessary to change the position of an aligning idler is especially great when a heavy-duty belt is trained around the deflecting rollers under considerable tension and/or when the weight of conveyed materials produces substantial tensioning stresses in the moving belt.

In certain other conventional aligning arrangements, the impulses produced by one or more sensing devices are transmitted to complicated electrical or mechanical adjusting mechanisms for the aligning idler. Such adjusting mechanisms must be provided with their own sources of power in order to generate forces which are strong enough to effect adjustments in the position of the aligning idler. Furthermore, and to my knowledge, such adjusting mechanisms are incapable of automatically changing the position of the aligning roller in such a way that the extent of adjustment is proportional to the extent to which a belt is running out of line. In other words, such adjusting mechanisms merely effect adjustments in the position of the aligning idler in response to an impulse received from the sensing device and thereupon remain inactive until the sensing device produces another impulse of predetermined magnitude. The drawbacks of such in-and-out adjusting mechanisms are well known to persons skilled in the art of belt conveyors.

Accordingly, it is an important object of my invention to provide an improved sensing device which, upon receiving impulses from a belt which is running out of line, is arranged to shift an aligning idler through a novel amplifier device so that very small impulses transmitted by the sensing device will suffice to produce substantial forces which might be necessary to change the position of the aligning idler.

Another object of the invention is to provide an aligning arrangement which embodies a sensing device and an amplifier device of the just outlined characteristics and which is constructed and assembled in such a way that the force necessary to adjust an aligning idler is always proportional to the extent to which a belt is running out of line.

A further object of the invention is to provide an aligning arrangement for conveyor belts whose operation is fully automatic, which occupies little space, which can be incorporated in all or nearly all belt conveyors of presently utilized design, and which need not be provided with its own source of power.

An additional object of the invention is to provide an aligning arrangement wherein a single sensing device and a single amplifier device will suffice to adjust a belt which is running out of line.

Still another object of the invention is to provide an aligning arrangement which is capable of continuously and automatically aligning a belt regardless of the extent to which the belt is running out of line.

A concomitant object of the invention is to provide a novel amplifier device which may be used in an aligning arrangement of the above outlined characteristics.

A further object of the invention is to provide an aligning arrangement whose sensitivity may be adjusted within a wide range, which is not prone to malfunction, and whose sensitivity may be adjusted while the belt is idle and/or while the belt is running.

Another object of the invention is to provide a belt conveyor which embodies one or more aligning arrangements of the above outlined characteristics and which is especially suited for use in various types of drying, heating, cooling and similar apparatus.

An additional object of the invention is to provide an aligning arrangement wherein the aligning idler need not be adjusted at intervals but is adjustable continuously so that the belt is never permitted to run out of line to an extent which might result in damage to the belt, to the remaining parts of the conveyor and/or to the material which is conveyed by the belt.

A further object of the invention is to provide an aligning arrangement of the just outlined characteristics wherein one of the deflecting rollers for the belt may supply the force necesary to change the position of one or more aligning idlers when the belt is running out of line.

With the above objects in view, one feature of my invention resides in the provision of a belt conveyor which comprises an elongated flexible belt, drive means including at least two deflecting rollers for advancing the belt in a predetermined path, and an aligning arrangement for keeping the belt in line. This aligning arrangement comprises a roll or an analogous sensing member which is adjacent to the path of and is movable by the belt so as to change its position to an extent which is proportional with the extent to which the belt is running out of line, an elongated aligning member (preferably an idler roller) which is adjacent to the path of and extends across the travelling belt, supporting means for swingably holding the aligning member so that the inclination of the aligning member with reference to the belt may be adjusted whereby the aligning member returns the belt in line, and amplifier means comprising a rotary friction generating member (e.g., a suitable pulley), which is driven by the drive means and a flexible element which is trained around the friction generating member. The ends of the flexible element are respectively connected (either directly or indirectly) with the sensing member and with one end of the aligning member, and the friction between the flexible element and the friction generating member increases in response to movement of the sensing member when the belt is running out of line whereby the friction generating member moves the flexible element endwise and the latter adjusts the aligning member.

It is normally preferred to place the sensing member into engagement with one edge face (i.e., with one marginal portion) of the travelling belt so that the sensing member travels transversely toward or away from the center line of the belt in response to movement of the belt in the axial direction of the deflecting rollers.

The novel features which are considered as characteristic of the invention are set forth in particular in the appended claims. The improved aligning arrangement itself, however, both as to its construction and its mode of operation, together with additional features and advantages thereof, will be best understood upon perusal of the following detailed description of a specific embodiment with reference to the accompanying drawing the single illustration of which is perspective view of a portion of a belt conveyor comprising an aligning arrangement which is constructed in accordance with my invention.

Referring to the drawing, there is shown a portion of a belt conveyor including a drive means comprising a deflecting roller 3, and a comparatively wide endless flexible belt 1 which is trained around the deflecting roller 3 at one end turn of the conveyor and around another deflecting roller (not shown) at the other end turn. The belt 1 comprises a lower stringer 2 and an upper stringer 2a and travels in a counterclockwise direction, see the arrow 1a. The shaft 3a of the deflecting roller 3 is driven by an electric motor 3b through a suitable transmission 3c.

The belt 1 has a tendency to run out of line, i.e., to move in the axial direction of the deflecting roller 3, and such tendency may be caused by unequal distribution of loads on the upper stringer 2a, by unequal stretching of the marginal portions of the belt, by changes in friction between the inner side of the belt and different portions of the peripheral surfaces on the deflecting rollers, and/or because the axes of the deflecting rollers are not exactly parallel to each other.

In order to return the belt 1 and to maintain the belt in its optimum position with reference to the deflecting rollers, I provide an improved aligning arrangement which comprises an aligning idler in the form of a roller 4, two sensing or feeler devices each including a sensing member in the form of a small roll 5 and a lever 6 one end of which supports the respective roll 5, and two novel amplifier devices which serve to adjust the position of the idler 4 in response to impulses received from the respective sensing devices and which exert upon the idler a force which is proportional with the extent to which the belt 1 is running out of line.

The peripheral surface of the idler 4 engages the underside of the upper stringer 2a along a line which is substantially perpendicular to the longitudinal extension of the belt 1, and the shaft 4a of this idler is suspended on the lower ends of two supporting arms 14 whose upper ends are swingably secured to a frame member 14a. Each supporting arm 14 preferably comprises two sections 14b, 14c which are rotatable with reference to each other so that the idler 4 may pivot with reference to the frame member 14a (in the longitudinal direction of the belt 1) and that it is also free to swivel with reference to the upper arm sections 14b so that its axis may make with the longitudinal extension of the upper stringer 2a on angle other than 90 degrees, i.e., that the inclination of the axis of the shaft 4a with reference to the longitudinal extension of the upper stringer 2a may be changed in response to movements of the idler relative to the frame member 14a.

Each lever 6 is secured to a vertical shaft 6a which is rotatable about a fixed axis in suitable antifriction bearings 6b, and each lever 6 carries a sleeve 6c which is detachably secured to the respective shaft 6a by a radially extending adjusting screw 6d or the like. Thus, the operator may adjust the angular position of the levers 6 merely by loosening the screws 6d in order to move the respective rolls 5 into stronger or weaker engagement with the edge faces of the lower stringer 2.

Each amplifier device comprises a comparatively long lever 7 one end of which carries a sleeve or hub 7a detachably fixed to the respective shaft 6a by a radially extending adjusting screw 7b or the like so that the operator may change the angular positions of the levers 7 with reference to the shafts 6a. The axes of the shafts 6a are perpendicular to the axis of the deflecting roller 3. The outer end of each lever 7 is connected with one end of a flexible friction generating element 8 which is trained around a guide sheave 9 and around a friction generating pulley 10 mounted coaxially on and rotating with the deflecting roller 3. The other end of each flexible element 8 is connected to the respective end of the idler shaft 4a. This shaft 4a is further connected with two additional flexible elements 11 which are trained around guide sheaves 13 and which are connected to the ends of a resilient return member here shown as an adjustable or exchangeable helical return spring 12.

The pulleys 10 rotate with respect to the corresponding flexible elements 8 whereby they generate a frictional force which varies in response to impulses produced by the sensing rolls 5 and may cause the elements 8 to change the angle between the axis of the idler shaft 4a and the longitudinal extension of the upper stringer 2a. This upper stringer is biased by a tensioning roll 15 which serves to press the belt against the peripheral surface of the idler 4.

Each flexible element 8 forms approximately one-half of a full convolution about the respective pulley 10, and at least that portion of each of these flexible elements which comes in engagement with the respective pulley may resemble a V-belt consisting of a material which will produce substantial friction when it is engaged by the surface bounding the groove in the peripheral surface of the respective pulley.

It will be noted that the length a of each lever 6 is substantially less than the length b of the corresponding lever 7 so that a very small angular displacement of a lever 6 will cause much greater angular displacement of the free end of the corresponding lever 7 which renders the aligning arrangement more sensitive.

The ends of the idler shaft 4a carry suitable plates or brackets 4b which are connected with the corresponding lower arm sections 14c and with the adjacent ends of the corresponding flexible elements 11.

The aligning arrangement of FIG. 1 operates as follows:

When the belt 1 is running out of line in that its lower stringer 2 tends to travel axially of the deflecting roller 3 and toward that sensing roll 5 which is nearer to the observer, the arm 6 will tend to pivot in a counterclockwise direction and will tend to pivot the arm 7 so that the flexible element 8 is subjected to tension which, in turn, creates a greater frictional force between the flexible element 8 and the cooperating pulley 10. This pulley entrains the flexible element 8 endwise, i.e., in the direction indicated by an arrow P, to expand the return spring 12 through the flexible element 11. Consequently, the inclination of the idler 4 will be changed to return the belt to its normal position.

When one of the flexible elements 11 tends to stretch the spring 12, the spring acts on the other element 11 to shift the other end of the idler shaft 4a in a direction to the right, as viewed in FIG. 1, to increase the aligning effect of the idler 4. When the belt is not running out of line, the spring 12 maintains the idler 4 in a neutral position in which the friction between each of the pulleys 10 and the corresponding flexible element 8 is the same, and such friction is insufficient to cause longitudinal (endwise) displacements of the elements 8 so that the aligning idler then remains in its neutral or inoperative position. It will be noted that, when the belt 1 is running out of line, one of the pulleys 10 tends to drive the corresponding flexible element 8 in the same direction in which the belt travels, and such endwise movements of the flexible elements 8 are transmitted to the aligning idler 4 to effect rapid return of the belt to its optimum position.

The sensing rolls 4 merely serve to send impulses to the amplifier devices in that they change the tension in the flexible elements 8 when the belt is running out of line. The amplifier devices cause the generation of forces which are necessary to change the position of the aligning idler 4, and these amplifier devices need not be equipped with their own sources of power since the power is furnished by the drive means for the belt conveyor.

The feature that the aligning arrangement comprises two sensing devices and two amplifier devices is of considerable advantage because such arrangement prevents oscillations of the belt in the axial direction of the deflecting rollers. In other words, as soon as the belt is returned to its optimum position after having been out of line in one direction, the other amplifier device takes over and prevents the belt from running out of line in the opposite direction. However, in many types of belt conveyors, a single sensing device and a single amplifier device will suffice to keep the belt from running out of line, especially if one end of each deflecting roller is provided with a flange or with similar stop means to prevent the belt from running out of line in one axial direction of the deflecting rollers. Furthermore, in many plants which utilize belt conveyors, the space available for an aligning arrangement is too small to accommodate more than a single amplifier device and a single sensing device.

It goes without saying that the position of each sensing roll 5 and the corresponding amplifier device may be reversed so that the rolls 5 are adjacent to the upper stringer 2a and that the aligning idler 4 is adjacent to the lower stringer 2. It is equally possible to place the idler 4 and the rolls 4 adjacent to the same stringer; all that is necessary to effect such simple modifications is to provide suitable guide sheaves for the flexible elements 8.

As stated above, it is not necessary that the entire length of each flexible element 8 consist of friction generating material. In the drawing, each element 8 comprises a portion 8a which is a V-belt whereas the remaining portions of these elements may consist of wire or cord whose ends are provided with hooks 8b so that the operator may change the effective length of the elements 8 by connecting a selected hook 8b to the respective lever 7. Similar hooks 11a are provided at one end of each flexible element 11 to facilitate adjustments in the bias of the return spring 12. In addition, the ends of the spring 12 may be disconnected from the eyes 11b of the flexible elements 11 so that this spring may be replaced by a stronger or weaker spring.

It is further to be noted that each of the levers 6 and 7 comprises two portions which are adjustable with reference to each other so as to vary the effective length of the respective lever. Some or all of such adjustments will be effected when the operator desires to change the sensitivity of the aligning arrangement or to adjust the aligning arrangement in response to changes in tension of the belt 1.

Without further analysis, the foregoing will so fully reveal the gist of the present invention that others can, by applying current knowledge, readily adapt it for various applications without omitting features which constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a belt conveyor, in combination, an elongated belt; drive means for advancing said belt in a predetermined path; and an aligning arrangement for keeping the belt in line, said aligning arrangement comprising a movable sensing member adjacent to the path of and movable by said belt so as to change its position to an extent which is proportional with the extent to which the belt is running out of line, an elongated aligning member adjacent to the path of and extending across said belt, supporting means for swingably holding said aligning member so that the inclination of said aligning member with reference to the belt may be adjusted whereby the aligning member returns the belt in line, and amplifier means comprising a rotary friction generating member driven by said drive means and a flexible element trained around said friction generating member and having a first end operatively connected with said sensing member and a second end operatively connected with one end of said aligning member, the friction between said flexible element and said friction generating member increasing in response to movement of said sensing member when the belt is running out of line whereby said friction generating member moves said flexible element endwise and the flexible element adjusts said aligning member.

2. In a belt conveyor, in combination, an endless belt having two spaced edge faces; drive means including a rotary deflecting roller for advancing said belt in a predetermined path; and an aligning arrangement for keeping the belt in line, said aligning arrangement comprising a movable sensing member adjacent to one of said edge faces and movable by said belt so as to change its position transversely of said belt to an extent which is proportional with the extent to which the belt is running out of line, an elongated aligning roller adjacent to the path of and extending across said belt, supporting means for swingably holding said aligning roller so that the inclination of said aligning roller with reference to the belt may be adjusted whereby the aligning roller returns the belt in line, and amplifier means comprising a rotary friction generating pulley coaxially secured to and driven by said deflecting roller and a flexible element trained around said pulley and having a first end operatively connected with said sensing member and a second end operatively connected with one end of said aligning roller, the friction between said flexible element and said pulley increasing in response to movement of said sensing member when the belt is running out of line whereby said pulley moves said flexible element endwise and the flexible element adjusts said aligning roller.

3. A combination as set forth in claim 2, wherein said sensing member is a roll and wherein said aligning arrangement further comprises a first lever arranged to pivot about a fixed axis and having a free end supportingly connected with said roll, and a second lever arranged to pivot about said fixed axis in response to pivoting of said first lever and having a free end connected with the first end of said flexible element.

4. A combination as set forth in claim 3, wherein the length of said second lever exceeds the length of said first lever.

5. A combination as set forth in claim 3, further comprising means for adjusting the angular position of at least one of said levers with reference to said fixed axis.

6. A combination as set forth in claim 2, wherein said flexible element comprises a portion of friction generating material which is trained around said pulley.

7. In a belt conveyor, in combination, an elongated belt; drive means including a deflecting roller around which said belt is trained and means for driving said deflecting roller so that the belt advances in a predetermined path; and an aligning arrangement for keeping the belt in line, said aligning arrangement comprising a movable sensing member adjacent to the path of and movable by said belt so as to change its position to an extent which is proportional with the extent to which the belt is running out of line, an elongated aligning member adjacent to the path of and extending across said belt, supporting means for swingably holding said aligning member so that the inclination of said aligning member with reference to the belt may be adjusted whereby the aligning member returns the belt in line, and amplifier means comprising a rotary friction generating pulley coaxially secured to and arranged to rotate with said deflecting roller and a flexible element trained around said pulley and having a first end operatively connected with said sensing member and a second end operatively connected with one end of said aligning member, the friction between said flexible element and said pulley increasing in response to movement of said sensing member when the belt is running out of line whereby said pulley moves said flexible element endwise and the flexible element adjusts said aligning member.

8. A combination as set forth in claim 7, wherein said belt comprises a first stringer and a second stringer, said aligning member comprising an idler roller engaging one of said stringers and said sensing member comprising a roll which engages the other stringer.

9. A combination as set forth in claim 8, wherein said roll is arranged to pivot about a fixed axis which is perpendicular to the axis of said deflecting roller.

10. In a belt conveyor, in combination, an elongated belt having two spaced edge faces; drive means for advancing said belt in a predetermined path; and an aligning arrangement for keeping the belt in line, said aligning arrangement comprising a pair of sensing members each adjacent to one of said edge faces and each movable by said belt so as to change its position to an extent which is proportional with the extent to which the belt is running out of line, an elongated aligning member adjacent to the path of and extending across said belt, supporting means for swingably holding said aligning member so that the inclination of said aligning member with reference to the belt may be adjusted whereby the aligning member returns the belt in line, and a pair of amplifier means each comprising a rotary friction generating member driven by said drive means and a flexible element trained around the respective friction generating member and having a first end operatively connected with one of said sensing members and a second end operatively connected with one end of said aligning member, the friction between each of said flexible elements and the cooperating friction generating member increasing in response to movement of the respective sensing member when the belt is running out of line whereby one of said friction generating members moves the cooperating flexible element endwise and the cooperating flexible element adjusts said aligning member.

11. In a belt conveyor, in combination, an elongated belt having two spaced edge faces; drive means for advancing said belt in a predetermined path; and an aligning arrangement for keeping the belt in line, said aligning arrangement comprising a pair of sensing members each adjacent to one of said edge faces and each movable by said belt so as to change its position to an extent which is proportional with the extent to which the belt is running out of line, an elongated aligning member adjacent to the path of and extending across said belt, supporting means for swingably holding said aligning member so that the inclination of said aligning member with reference to the belt may be adjusted whereby the aligning member returns the belt in line, a pair of amplifier means each comprising a rotary friction generating member driven by said drive means and a flexible element trained around the respective friction generating member and having a first end operatively connected with one of said sensing members and a second end operatively connected with one end of said aligning member, the friction between each of said flexible elements and the cooperating friction generating member increasing in response to movement of the respective sensing member when the belt is running out of line whereby one of said friction generating members moves the cooperating flexible element endwise and the cooperating flexible element adjusts said aligning member, and resilient return means for biasing said aligning member to a neutral position when said belt is in line.

12. A combination as set forth in claim 11, wherein said resilient return means comprises a helical expansion spring and wherein said aligning arrangement further comprises a pair of additional flexible elements each having a first end operatively connected with one end of said spring and another end operatively connected with one end of said aligning member so that the bias of said spring opposes the frictional forces which tend to move said first mentioned flexible elements endwise in response to movement of one of said sensing members when the belt is running out of line.

13. A combination as set forth in claim 12, further comprising means for adjusting the effective length of said flexible elements.

14. A combination as set forth in claim 10, wherein said belt comprises two stringers and wherein said drive means comprises a deflecting roller disposed between said stringers, said friction generating members being secured to and rotating with said deflecting roller, and said sensing members and said aligning member respectively engaging different stringers of said belt.

15. A combination as set forth in claim 14, wherein said sensing members comprise rolls arranged to pivot about fixed axes which are perpendicular to the axis of said deflecting roller.

References Cited by the Examiner
UNITED STATES PATENTS

| | | | |
|---|---|---|---|
| 2,783,871 | 3/1957 | Sowards | 198—202 |
| 2,914,957 | 12/1959 | Johnson | 198—202 |

SAMUEL F. COLEMAN, *Primary Examiner.*

RICHARD E. AEGERTER, *Examiner.*